US005159141A

United States Patent [19]

Iba

[11] Patent Number: 5,159,141

[45] Date of Patent: Oct. 27, 1992

[54] APPARATUS FOR CONTROLLING REPRODUCTION STATES OF AUDIO SIGNALS RECORDED IN RECORDING MEDIUM AND GENERATION STATES OF MUSICAL SOUND SIGNALS

[75] Inventor: Akio Iba, Tokorozawa, Japan

[73] Assignee: Casio Computer Co., Ltd., Tokyo, Japan

[21] Appl. No.: 686,030

[22] Filed: Apr. 16, 1991

[30] Foreign Application Priority Data

Apr. 23, 1990 [JP] Japan ............................ 2-43395[U]
Apr. 23, 1990 [JP] Japan ............................ 2-107287

[51] Int. Cl.[5] ........................ G10H 7/00; H02M 5/00

[52] U.S. Cl. ........................................ 84/619; 84/657; 84/613; 84/637; 84/605

[58] Field of Search ................................ 84/600-602, 84/605, 609, 612, 619, 625, 636, 645, 648, 652, 657, 660, 668, 613, 615, 653, 639-642, 634, 637, DIG. 1, DIG. 11, DIG. 27

[56] References Cited

U.S. PATENT DOCUMENTS 3,610,800 10/1971 Deutsch .
3,869,708 3/1975 Schiffman .
4,256,008 3/1981 Ryon .................................. 84/454
4,419,918 12/1983 Dyck et al. ............. 84/DIG. 11 X
4,566,362 1/1986 Kikumoto ............... 84/DIG. 12 X
4,694,724 9/1987 Kikumoto et al. ....... 84/DIG. 29 X
4,977,550 12/1990 Furuya et al. ....................... 369/32
4,991,484 2/1991 Kawashima ......................... 84/603
5,038,660 8/1991 Watanabe ........................... 84/601
5,054,360 10/1991 Lisle et al. .......................... 84/645
5,062,097 10/1991 Kumaoka ......................... 84/645 X
5,067,119 11/1991 Yoshida et al. .................. 84/622 X
5,079,984 1/1992 Kosugi et al. ....................... 84/645

*Primary Examiner*—William M. Shoop, Jr.
*Assistant Examiner*—Jeffrey W. Donels
*Attorney, Agent, or Firm*—Frishauf, Holtz, Goodman & Woodward

[57] ABSTRACT

This invention realizes a musical instrument, automatically transposing the pitches of the sounds reproduced from the musical instruments played by a performer, based on the pitch changes of the reproduced sounds caused by the changes in the reproduction speeds of audio equipment.

Thus, this invention enables a performer to play an electronic musical instrument at a desired speed without having to retune it, when performer play musical instrument accompanying music sound reproduced by audio equipment.

7 Claims, 12 Drawing Sheets

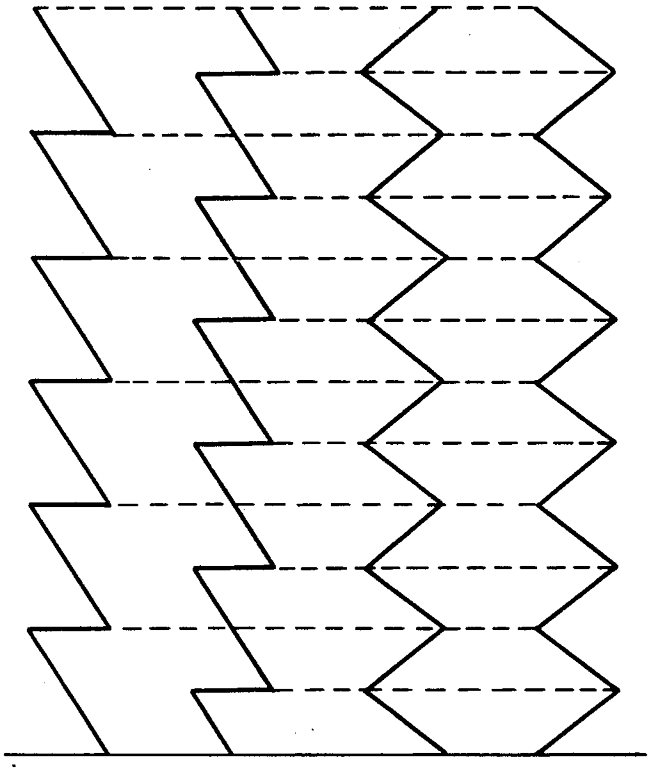
FIG.13A ADDRESS SIGNAL LF1L
FIG.13B ADDRESS SIGNAL LF1R
FIG.13C AMPLITUDE DATA LF2L
FIG.13D AMPLITUDE DATA LF2R

APPARATUS FOR CONTROLLING REPRODUCTION STATES OF AUDIO SIGNALS RECORDED IN RECORDING MEDIUM AND GENERATION STATES OF MUSICAL SOUND SIGNALS

BACKGROUND OF THE INVENTION

1. Field of the Invention

This invention pertains to an electronic musical instrument automatically adjusting the pitches of musical instruments being played or reproduced sounds, according to the changes in the pitches of the reproduced sounds caused by the changes in the reproduction speed by audio reproducing equipment, when performers play musical instruments accompanying a music reproduced by audio equipment.

2. Description of the Related Art

Playing electronic musical instruments accompanying musics reproduced e.g. from a compact disk (CD) enables excellent ambience to be obtained, which is impossible by an playing of a musical instrument alone. However, there are cases in which amateur performers, especially novices, cannot keep up the keyboard operations with the performance tempo in music reproduced from the CD and thus want to lower the reproduction speed.

There are other cases in which an adjustment of CD performance tempo is desired for accompaniment.

In such a case, although the performance tempo of the CD reproduced sounds can be adjusted by altering the reproduction speed of a CD player, the pitches of the CD reproduced sounds are changed concomitantly.

This requires a cumbersome readjustment (retuning) of pitches of the electronic musical instrument, which is quite difficult because it must be done by producing the sounds from the musical instruments concurrently with listening to the reproduced sounds.

SUMMARY OF THE INVENTION

This invention is conceived based on the above background. It is an object of the invention to realize a musical instrument, automatically transposing the pitches of the sounds reproduced from the musical instruments played by a performer, based on the pitch changes of the reproduced sounds caused by the changes in the reproduction speeds of audio equipment.

Another object of the invention is to realize a musical instrument, thereby conforming the pitches of the audio signals to the pitches before changing the reproduction speed, when reproduction speed of audio equipment are changed.

An electronic musical instrument per this invention comprises an audio reproducing means for reproducing sounds from audio signals recorded in recording media, a musical sound signal generating means for generating musical sound signals based on performance information, a speed controlling means, connected to the audio reproducing means, for controlling the audio reproducing means to change its speed of reproducing sounds from the recording media by predetermined ratios, and a musical sound pitch changing means, connected to the musical sound signal generating means and the speed controlling means, for changing the pitches of the musical sound signals generated by the musical sound signal generating means, by the predetermined ratios corresponding to the changing ratios of reproduction speeds, when the speed controlling means changes the speed of reproducing sounds by the predetermined ratios.

Since this invention enables the pitches of musical sounds generated by an electronic musical instrument played by a performer to be changed by the same ratios by which the performance tempo in music reproduced from the CD is changed by changing the reproducing speed of audio reproducing means by the predetemined ratios, when the performer plays the electronic musical instrument accompanying the music reproduced by an audio reproducing unit, e.g. a CD player, the electronic musical instrument produces the played musical sounds in harmony with the reproduced musical sounds in accompaniment.

BRIEF DESCRIPTION OF THE DRAWINGS

Those in the same field can easily understand additional purposes and features of this invention from the descriptions of the principles and the suitable embodiment of this invention together with the attached drawings. In the drawings;

FIGS. 13A through 13D show the amplitude data and address signals of the pitch changers used in the second embodiment of this invention.

DESCRIPTION OF THE PREFERRED EMBODIMENTS

First Embodiment

The following is a description of the first embodiment, in which this invention is applied to a performance of an electronic keyboard musical instrument accompanying a reproduction of musical sounds by a CD player.

Figure 1:
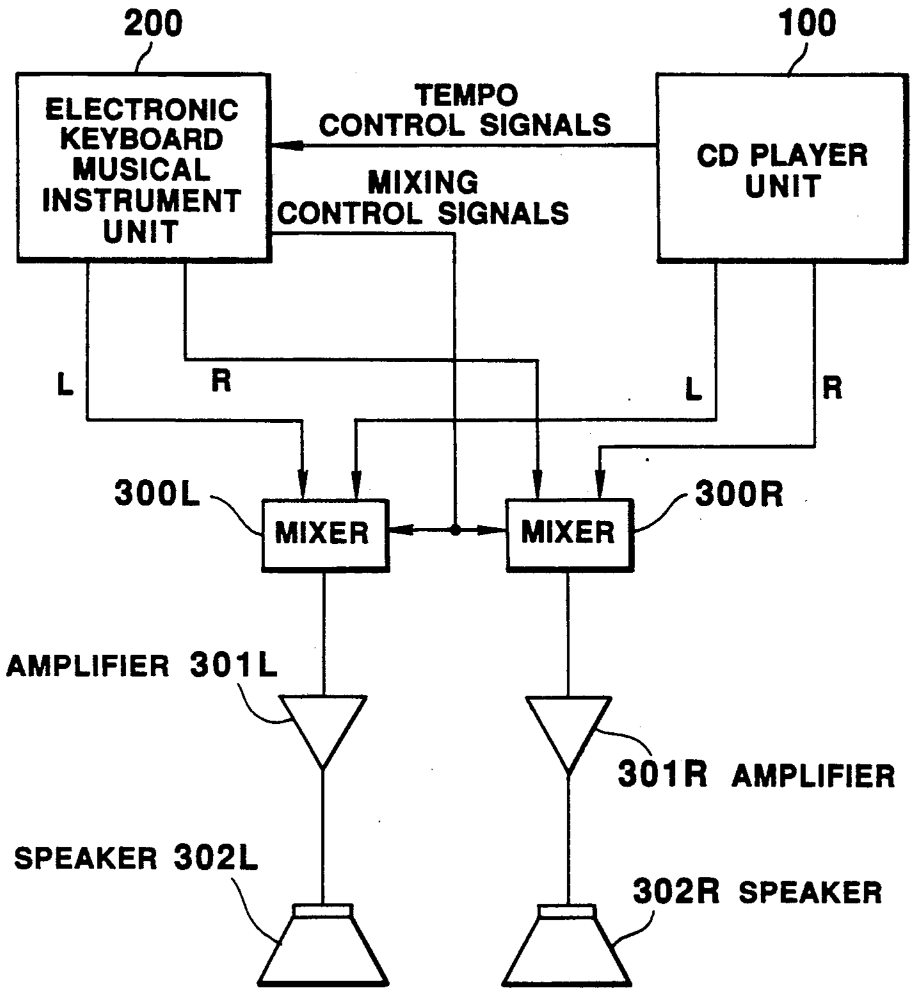
FIG. 1 shows the schematic configuration of the first embodiment of this invention.

FIG. 1 shows the schematic configuration of the first embodiment of this invention.

The electronic musical instrument in the first embodiment basically comprises a CD player unit 100 and an electronic keyboard musical instrument unit 200.

In FIG. 1, when a performer depresses one of two tempo control buttons 129 described later, the CD player unit 100 outputs tempo control signals and changes its speed of reproducing musical sounds from a CD 101 described later, thereby changing the tempos and pitches of the CD reproduced musical sounds. The tempo control signals automatically adjust the pitches of the musical sounds produced by the electronic keyboard musical instrument unit 200 according to the pitch changes.

Mixers 300L and 300R respectively mix stereo outputs Left (L) and Right (R) reproduced from the CD by the CD player unit 100 with stereo outputs L and R produced by the electronic keyboard musical instrument unit 200. Mixing control signals outputted from the electronic keyboard musical instrument unit 200 in correspondence with the position of a mixer switch 202*a* shown in FIG. 8 (a part of a musical instrument console 202 illustrated in FIG. 7) set the mixing ratio.

Speakers 302L and 302R respectively turn the stereo outputs from mixers 300L and 300R gone through amplifiers 301L and 301R into played musical sounds mixed with reproduced musical sounds for accompaniment.

The following is a description of a configuration of the CD player unit 100.

Figure 2:
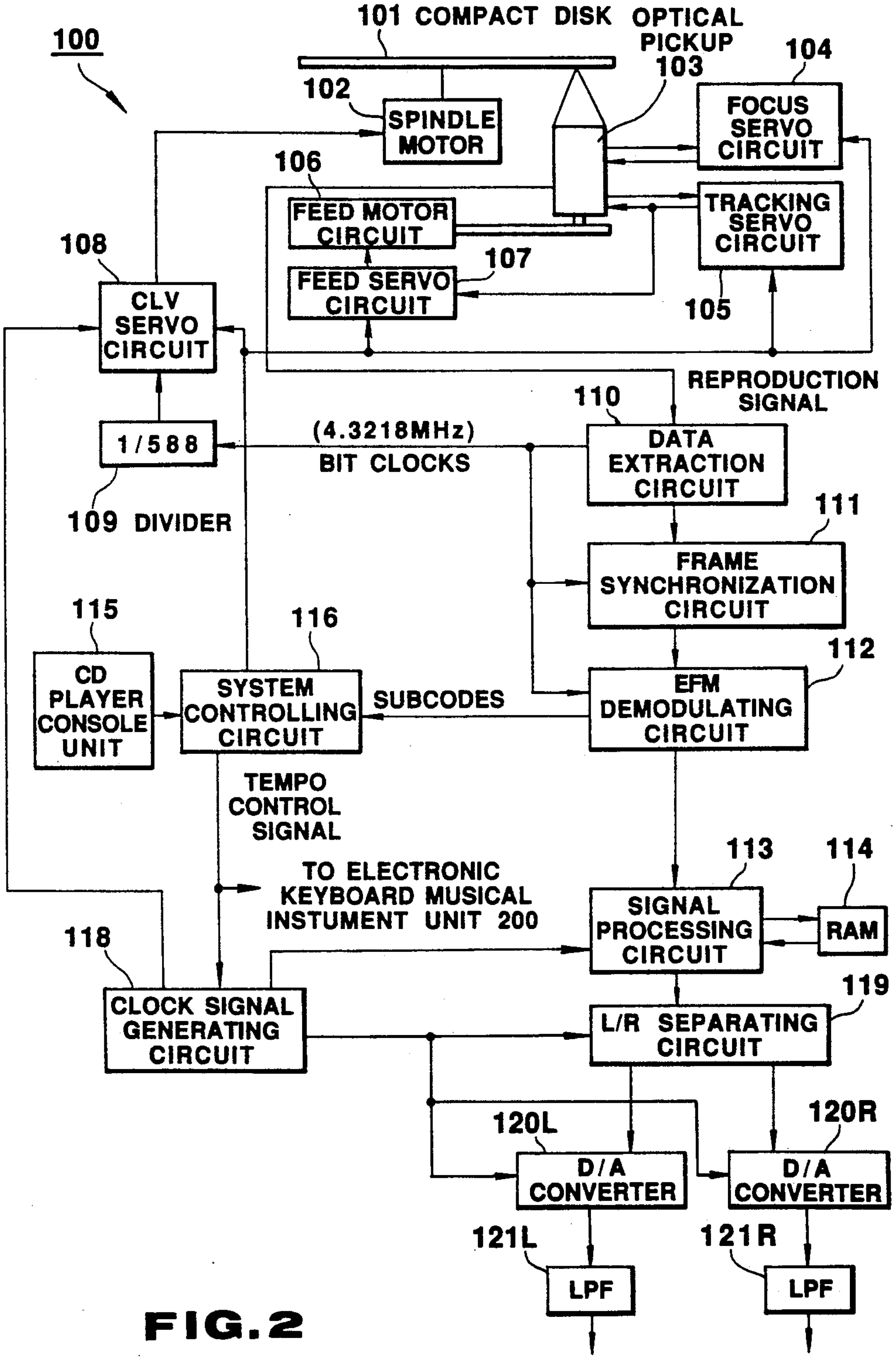
FIG. 2 is a block diagram of the CD player unit used in the first embodiment of this invention.

FIG. 2 is a block diagram of the CD player unit used in the first embodiment of this invention.

Figure 3:
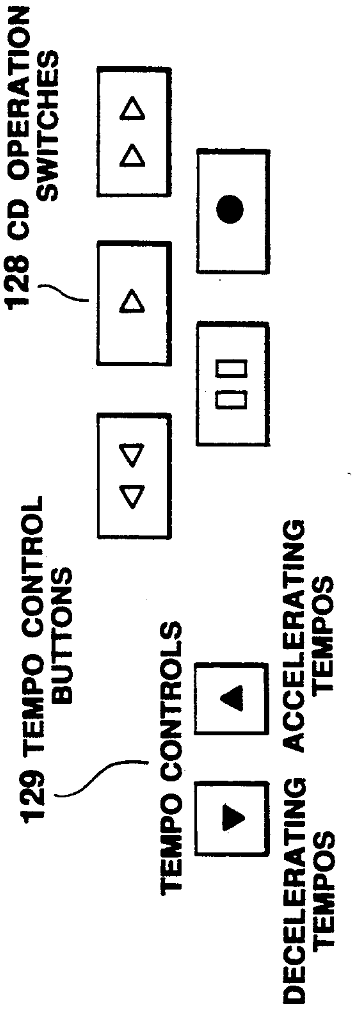
FIG. 3 shows an example of a CD player console unit used commonly in the first and second embodiments of this invention.

FIG. 3 shows, in detail, an example of a CD player console unit used commonly in the first and second embodiments of this invention.

In FIG. 2, the CD 101 is set in a holder unit, not shown in the drawing, of the CD player unit 100. A CD player console unit 115 has two tempo control buttons 129, shown in FIG. 3, for accelerating or decelerating tempos of the musical sounds reproduced from the CD 101 by changing the reproduction speeds, besides CD operation switches 128 for controlling functions such as play, stop, temporary halt, fast forward, and fast backward, which are included in an ordinary CD player.

A system controlling circuit 116, e.g. a microprocessor, controls the CD player unit 100 in its entirety. It outputs driving control signals to a CLV (Constant Linear Velocity) servo circuit 108, a focus servo circuit 104 and a feed servo circuit 107, when the CD 101 is driven.

Although the CLV servo circuit 108, related especially to the essence of this invention, is described later in detail, it makes the linear velocities of respective tracks of the CD 101 to be constant by controlling the revolutions of a spindle motor 102 for driving the revolution of the CD 101.

The focus servo circuit 104 detects a focus error from the state of laser beam reflection, and controls and drives the objective lens in an optical pickup 103 in the optical axis direction based on the detected focus error. The feed servo circuit 107 control a feed motor 106, which moves the optical pickup 103 in the radial direction of the CD 101 by detecting laser beam differences from the track center of the CD 101. The tracking servo circuit 105 moves the optical pickup 103 itself for tracking appropriate tracks, when laser beam differences fluctuate rapidly due to the eccentricity of the optical pickup 103.

Thus, the feed servo circuit 107 and the tracking servo circuit 105 controls the optical pickup 103 to correctly irradiate laser beams to the track center of the CD 101.

The surface of the CD 101 irradiated by laser beams have extrusions called pits, which record digital signals. The optical pickup 103 detects the existence of pits based on the luminous energies of the reflections of irradiated laser beams, reads the existence of pits and digital signals corresponding to their lengths, and inputs them to a data extraction circuit 110 as reproduction signals.

The reproduction signals are sorts of pulse series. Since their pulse widths change from 3 to 11 in lengths, when the pulses are differentiated, discontinuous pulse series partially lacking pulses are obtained. Accordingly, bit clocks are extracted by converting them to continuous pulse series by using a phase locked loop (PLL) for extracting clock signals 126 (such as one shown in FIG. 4) provided in the data extraction circuit 110. To be more specific, the PLL for extracting 126 clock signals shown in FIG. 4 comprises a phase comparator 124, a voltage controlled oscillator (VCO) 125 and a loop filter LF.

The following is a description of a CD frame format related only to this invention.

Figure 6:
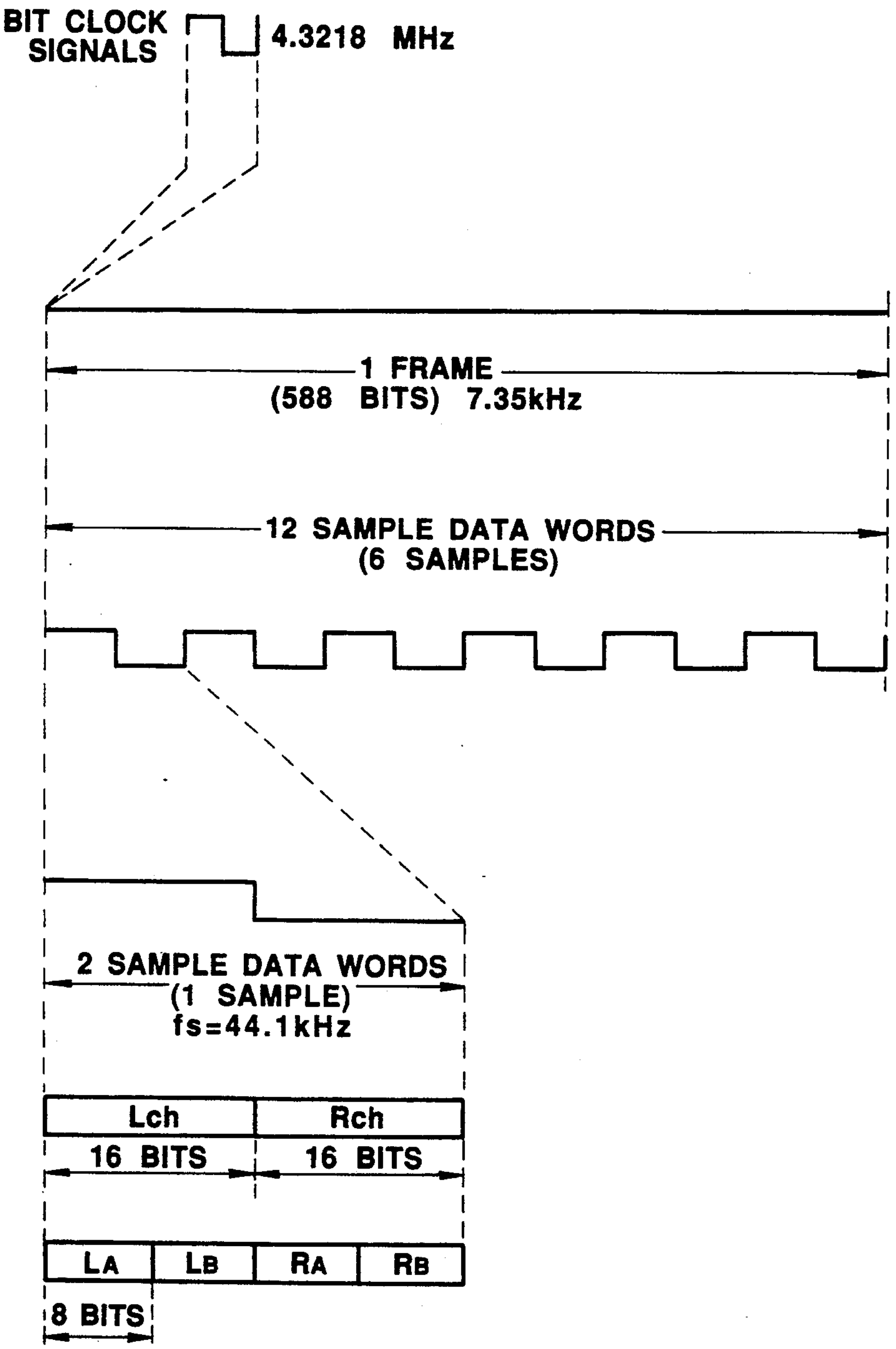
FIG. 6 shows the frequency correspondence between the recorded and reproduced signals of a CD according to the first embodiment of this invention.

FIG. 6 shows the frequency correspondence between the recorded and reproduced signals of a CD according to the first embodiment of this invention.

A frame of a CD signal comprises 588-bit data. The head 24 bits in the respective frames are reserved for frame synchronous signals. Since each frame contains twelve (12) sample data words of six samples for the left (L) and right (R) channels, one frame takes time of $6/f_s$ (sec), where $f_s$ is a sampling frequency. This time is corresponding to frequency of 7.35 KHz. Since a frame contains 588-bit data, the bit clocks in CD reproduction signals are calculated to be 4.3218 MHz(=7.35 KHz×588), when the CD 101 is played at the normal speed without being applied with a tempo control described later.

The following is a description of the data extraction circuit 110. FIG. 2 is referred back to.

The data extraction circuit 110 extracts the above described bit clocks by digitizing the reproduction signals into binary values, and transmits the bit clocks to a divider 109, a frame synchronization circuit 111 and an eight-to-fourteen-modulation (EFM) demodulating circuit 112. It also outputs digitized reproduction signals to the frame synchronization circuit 111. The frame synchronization circuit 111 detects frame synchronization signal from the inputted reproduction data and outputs the data being cur off at every flame to the EFM demodulating circuit 112 using detected frame synchronization signal. The EFM demodulating circuit 112 demodulates 14-bit digital data (such as subcodes and audio data), in respective frames, modulated by the EFM method described later into 8-bit data.

At this time, the respective occurrence probabilities of logical "1" and "0" in respective bits of the digital data are not known. When the optical pickup 103 shown in FIG. 2 detects digital data from the pits on the CD 101 as electric signals, if either logical "1" or "0" continues sufficiently long, the electric signals become a direct current and bit spacing information interrupts, which causes the focus servo circuit 104 for controlling the optical pickup 103 based on the outputs therefrom or other servo circuits to operate erroneously.

For eliminating such a direct current as much as possible, a data conversion method called the EFM [Eight (8) to Fourteen (14) Modulation] is employed, whereby a series of 8-bit digital data recorded in the pits of the CD 101 are converted to a series of 14-bit digital data without a long continuation of logical "1" or "0". The EFM demodulating circuit 112 shown in FIG. 2 demodulates EFM 14-bit data converted from the reproduction signals back to the original 8-bit data.

As described above, among the EFM demodulated data, the audio data are inputted to a signal processing circuit 113 and subcodes are inputted to the system controlling circuit 116. Since the subcodes are not directly related to the essence of this invention, they are not explained here.

The signal processing circuit 113 sequentially writes the inputted audio data to a RAM 114 and corrects their errors based on an error correction code called the CIRC (Cross Interleave Reed-Solomon Code) and restores 16-bit samples of respective digital audio data by de-interleaving the inputted audio data in frame units. The RAM 114 is also used as a buffer circuit for adjusting the the time axis fluctuating by the motor revolution jitters. The signal processing circuit 113 executes the above described processings based on the clock signals received from a clock signal generating circuit 118.

Thereafter, an L/R separating circuit 119 separates the 16-bit samples of digital audio data into 16-bit samples respectively representing L and R stereo sound signals. After D/A (digital to analog) converters 120L and 120R convert these separated samples into analog signals, LPF 121L and LPF 121R output them as analog audio data.

The following is a description of the clock signal generating circuit 118.

Figure 4:
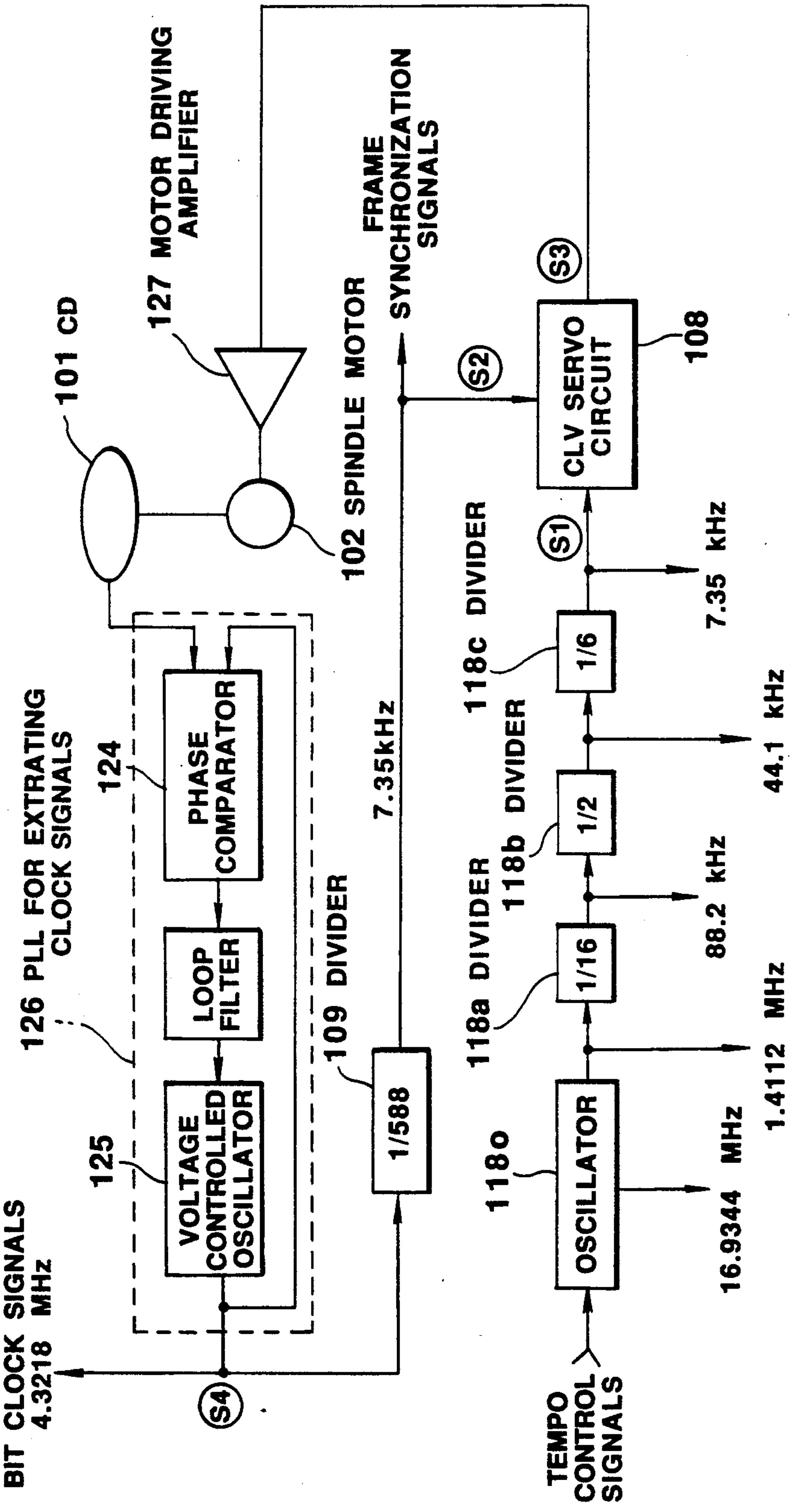
FIG. 4 explains the clock and constant linear velocity (CLV) servo of the CD player unit used in the first embodiment of this invention.

FIG. 4 explains the clock and constant linear velocity (CLV) servo of the CD player unit used in the first embodiment of this invention.

In FIG. 4, the clock signal generating circuit 118 contains dividing circuits 118*a*, 118*b* and 118*c* for sequentially dividing the oscillating frequencies of an oscillator 118*o* by integers. Clocks of 88.2 KHz and 44.1 KHz are respectively used as clocks for L/R separation and reading in D/A conversion. A clock of 7.35 KHz is used for the CLV servo circuit 108. Another oscillating frequency of the oscillator 118*o* at 16.9344 MHz and another timing signals not shown in FIG. 4 is used for the clock signals of the large scale integrated circuits (LSIs) configuring the respective circuits. Incidentally, the above frequencies can change according to the tempo control signal described later.

The following is a description of the CLV servo system, which is based essentially on the PLL method.

Figure 5A:
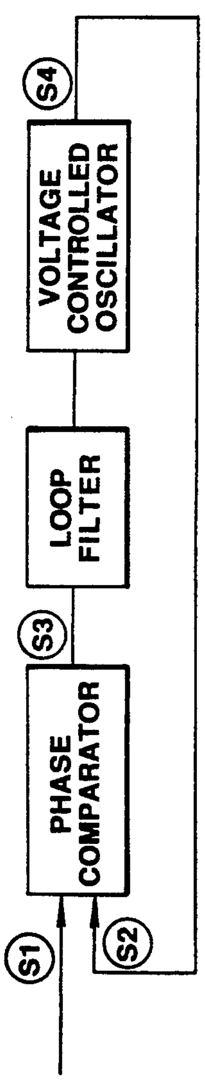
FIG. 5A shows basic configuration of a phase locked loop (PLL)

FIG. 5A shows the configuration of the basic configuration of a phase locked loop (PLL).

A phase error voltage detected by the phase comparator is fed back to the phase comparator through the loop filter and the VCO.

Figure 5B:
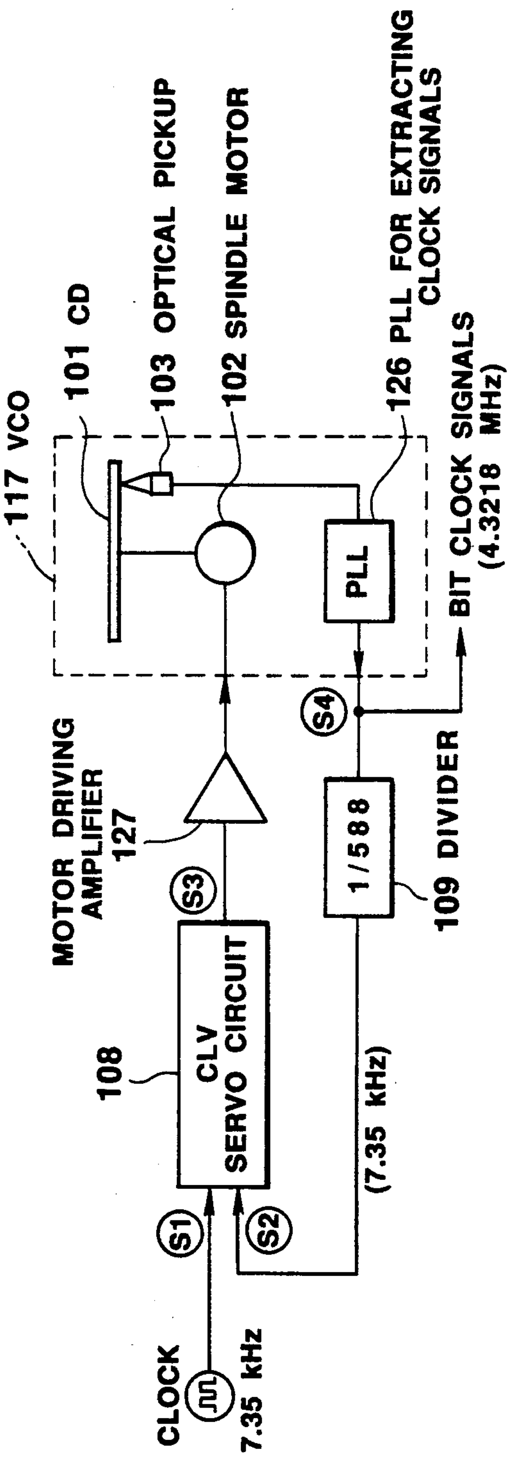
FIG. 5B is a block diagram of the CLV servo system used in the first embodiment of this invention.

FIG. 5B is a block diagram of the CLV servo system used in the first embodiment of this invention.

FIG. 5B reexpresses the CLV servo system related to the CLV servo system shown in FIG. 4 by the PLL shown in FIG. 5A(, although the loop filter is not shown). Alphanumerics S1 through S4 in FIG. 5B correspond to the same alphanumerics in FIGS. 4 and 5A. The CLV servo circuit 108 in FIGS. 2 and 5B corresponds to the phase comparator 124 of the PLL in FIGS. 4 and 5A. The CD 101, the spindle motor 102, the optical pickup 103 and the PLL for extracting clock signals 126 in a dashed line frame part 117 act in lieu of the VCO 125 in FIG. 5A. Voltages outputted from a motor driving amplifier 127 controls the frequencies of the signal pulses reproduced from the CD 101 by changing the revolutions of the spindle motor 102. Thus, the clock pulses of input S2 into the CLV servo circuit 108 are completely locked by the clock signals of input S1 (where their frequency is 7.35 KHz). At this time, input S4 in the divider 109 is a bit clock signal having a frequency at 4.3218 MHz($=7.35$ KHz$\times 588$) and the same degree of accuracy and stability as the crystal oscillator used as a standard. At this time, the linear velocity is kept constant, while the respective tracks in the CD 101 are read for sound reproduction.

The following is a description of a control for changing the tempos by changing the reproduction speed, which is a feature of this invention.

Usually, the lock range of a PLL is in the order of a few per cents of the frequencies inputted to a phase comparator. When this input frequencies are changed, the frequencies outputted from the PLL are changed in a desired manner. The frequency of PLL can be freely changed with the PLL kept locked by changing the input frequency.

That is, by changing the clock signal frequencies of input S1 to the phase comparator (shown in FIGS. 4 and 5A) in a CLV servo system for driving a CD by a PLL, the CD reproduction speed can be freely changed within a predetermined range, with the PLL kept locked.

As stated earlier, the clock signal frequency of 7.35 KHz supplied to the CLV servo circuit 108 shown in FIG. 4 (equivalent to the phase comparator 124 shown in FIG. 5A) is the one used at an ordinary CD playing.

When this frequency is changed, the CLV servo system changes the reproduction speed proportionate to this frequency, i.e. the tempo, and the pitches of the reproduced sounds. Each time one of the tempo control buttons 129, shown in FIG. 3, on the CD player console unit 115 is depressed, the system controlling circuit 116 output a tempo control signal and the frequency of the clock signal generating circuit 118 changes by a semitone, i.e. in the ratio of $2^{1/12}(=1.059)$. Thus, the pitches and the tempos of the CD reproduced sounds change by this ratio. One of the two tempo control buttons 129 are used for accelerating or decelerating the tempos and pitches. Such frequency changes are realized by controlling, with tempo control signals, the oscillator 118*o*, shown in FIG. 4, made of a programmable crystal oscillator or a ceramic oscillator capable of varying oscillating frequencies.

Thus, when the frequencies of the clock signal generating circuit 118 are changed, the frequencies of the bit clock signals are changed by the same ratio, i.e. $2^{1/12}$, concurrently as well as the clock signal frequencies of the signal processing circuit 113, sampling frequencies of the D/A converters 120L and 120R, the clock signal frequencies of the L/R separating circuit 119, and other pertinent frequencies, such as those of various clocks for the earlier stated LSIs and the frame synchronization signals.

When the tempos of playing the CD 101 are changed, as described above, the pitches of the reproduced musical sounds are also changed. This invention enables an automatic transposition of the pitches of the musical sounds produced by an electronic musical instruments in correspondence with the pitch changes of the CD reproduce sounds.

Figure 7:
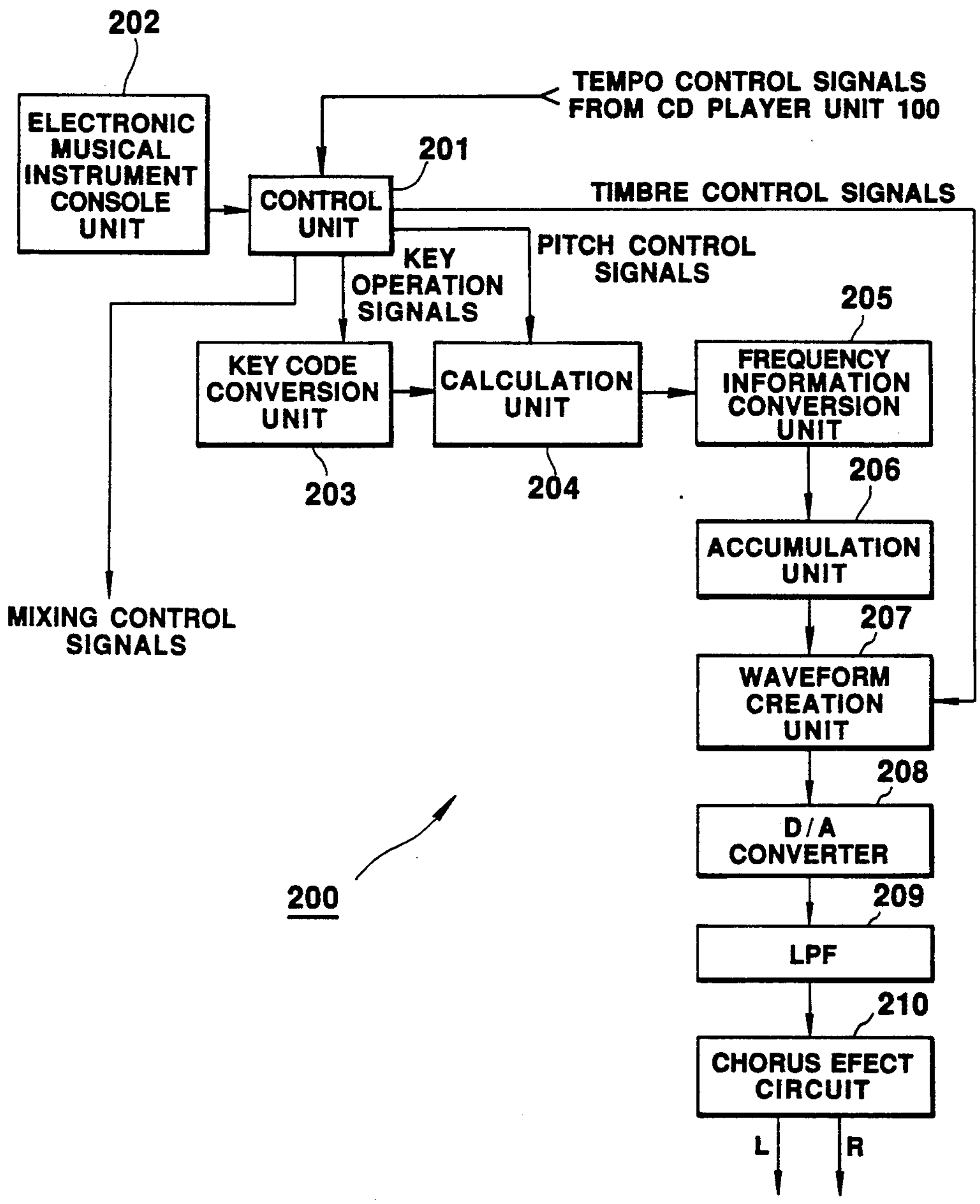
FIG. 7 is a block diagram of an electronic keyboard musical instrument unit used in the first embodiment of this invention.

The following is a description of the pitch transposition performed by the electronic keyboard musical instrument unit 200 of which detail is shown in FIG. 7.

FIG. 7 is a block diagram of an electronic keyboard musical instrument unit used in the first embodiment of this invention.

Figure 8:
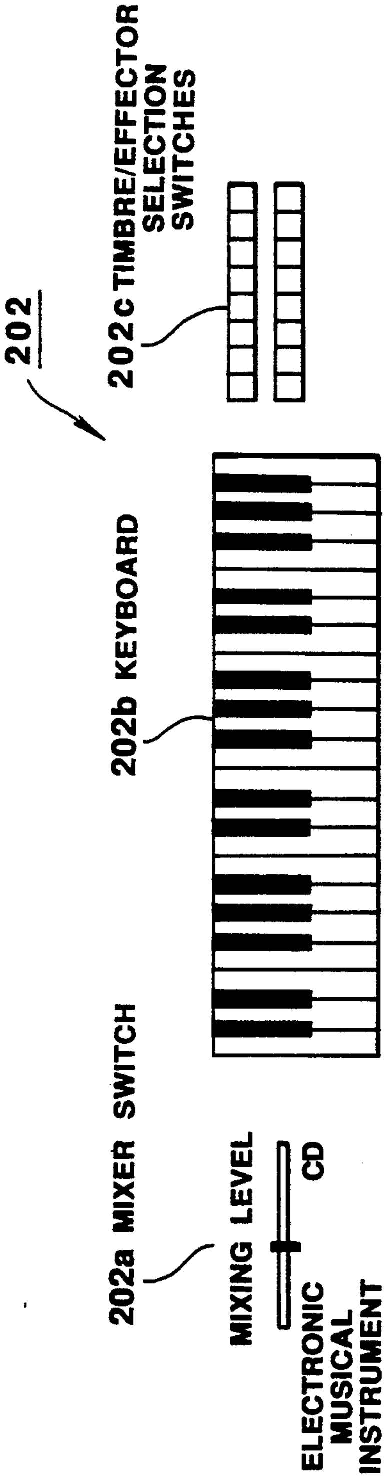
FIG. 8 shows, in detail, an example of an electronic keyboard musical instrument console unit used commonly in the first and second embodiments of this invention.

FIG. 8 shows, in detail, an example of an electronic keyboard musical instrument console unit used commonly in the first and second embodiments of this invention.

In FIG. 8, an electronic musical instrument console unit 202 shown in FIG. 7 has the already described mixer switch 202*a* for mixing the musical sounds produced by the electronic musical instruments with the sounds reproduced from the CD, a keyboard 202*b* and timbre/effector switches 202*c*.

Back in FIG. 7, a control unit 201 comprises a depressed key detection/sound production assignment circuit, which receives information regarding which keys on the keyboard 202*b* in the electronic musical instrument console unit 202 are being depressed by scanning keys at a predetermined cycle. When a key is depressed, the control unit 201 assigns the depressed key to any of a plurality of sound production assignment channels, and transmits the key operation signals based on the key operation to a key code conversion unit 203, which converts the key operation signals to the key code for identifying the depressed key and inputs the key code to a calculation unit 204.

The key code comprises an octave code and a note code. The octave code expresses in a binary form the particular octave to which the depressed key belongs, such as 000 for keys C2 through B2, 001 for keys C3 through B3, and 010 for keys C4 through B4. The note code expresses in a binary form the twelve (12) sounds in a octave to which the depressed key belongs, such as 0000 for C sounds, 0001 for C# sounds, and 1011 for B sounds.

In FIG. 7, if the performer manipulates neither of the tempo control buttons 129 shown in FIG. 3, the key code is inputted "as is" to a frequency information conversion unit 205 without being subjected to the operation of a calculation unit 204, and the frequency information conversion unit 205 outputs the frequency number corresponding to the pitch of the key code. Then, an accumulation unit 206 repeats accumulations of the frequency number at a predetermined cycle and outputs the accumulated value, which changes at the speed corresponding to the key number, to a waveform creation unit 207. Next, the accumulated value is used e.g. as an address of the waveform creation unit 207, which is a waveform memory, in reading musical sound waveform data from the waveform creation unit 207. When the performer selects a musical instrument timbre by manipulating one of the timbre/effector selection switches 202*c*, the control unit 201 outputs timbre control signals to the waveform creation unit 207 and the waveform data corresponding to the selected one of the timbre/effector selection switches 202*c* are read.

The waveform data thus read become the musical sound signals having the pitch corresponding to the key code of the depressed key. After an D/A converter 208 converts the musical sound signals to analog signals, an LPF 209 smooth the analog signals. If a chorus effect is selected by the timbre/effector selection switches 202*c*, a chorus effect circuit 210 separates the analog signals into two channel (L and R) musical sound signals having a quasi-stereo effect.

On the other hand, if the performer, desiring to change the tempo of the musical sounds reproduced from the CD 101, manipulates either of the tempo control buttons 129 shown in FIG. 3, the system controlling circuit 116 in the CD player unit 100 outputs tempo control signals to the control unit 201 in the electronic keyboard musical instrument unit 200. As a result, the control unit 201 outputs the pitch control signals indicating the pitch change corresponding to the tempo change and adds the pitch control signals to the key code outputted from the key code conversion unit 203. For instance, when the note code of the depressed key is 0001 (C#) and a semitone is raised, a pitch control signal 0001 is added, and after the above actions are performed, a note code 0010 (D) is produced.

As is evident from the above description, when the tempo is changed by changes in the CD sound reproduction speed, the musical sounds produced by the player of the electronic musical instrument are automatically transposed corresponding to the accompanying pitch changes.

Although the first embodiment of this invention explains the case in which an electronic musical instrument is played accompanied by sound reproduction by a CD player, the CD player can be substituted by some other audio reproduction device, such as a digital audio tape recorder (DAT), a compact cassette recorder or an LP record player. An electronic musical instrument is not limited to an electronic keyboard musical instrument but can be an electronic wind musical instrument or an electronic stringed musical instrument.

Instead of a note code of the key of depressed by the player, a note code read from an automatic performance memory can be transposed in correspondence with the pitch changes of the audio reproduction sounds.

The change ratio is not limited to semitone units but could be whole tone units.

Second Embodiment

The following is a description of the second embodiment, in which this invention is applied to a performance of an electronic keyboard musical instrument accompanying a reproduction of musical sounds by a CD player. The same numbers are assigned to the parts used in the second embodiment having the same functions as those used in the first embodiment, and their explanations are omitted.

Figure 9:
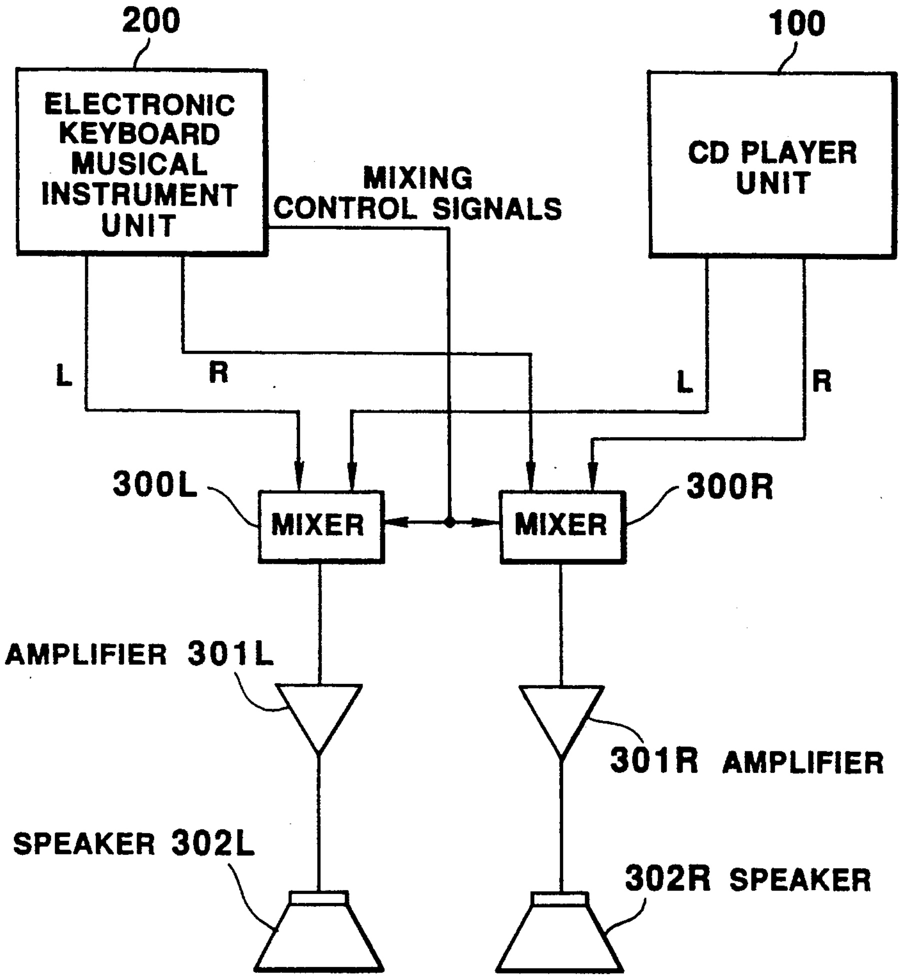
FIG. 9 shows the schematic configuration of the second embodiment of this invention.

FIG. 9 shows the schematic configuration of a second embodiment of this invention.

The electronic musical instrument in the second embodiment is very similarly configured to that in the first embodiment. That is, it basically comprises the CD player unit 100 and the electronic keyboard musical instrument unit 200, too.

In FIG. 9, when a performer depresses one of the two tempo control buttons 129 described earlier, the CD player unit 100 changes its speed of reproducing musical sounds from the CD 101 described earlier, thereby changing the tempos and pitches of the CD reproduced musical sounds. Later described pitch changers 122L and 122R inside the CD player unit 100 act to reverse only the changed pitches back to the original pitches while tempos remain changed. Mixers 300L and 300R respectively mix stereo outputs Left (L) and Right (R) reproduced from the CD by the CD player unit 100 with stereo outputs L and R produced by the electronic keyboard musical instrument unit 200. Mixing control signals outputted from the electronic keyboard musical instrument unit 200 in correspondence with the position of the mixer switch 202*a* shown in FIG. 8 (a part of a musical instrument console 202 illustrated in FIG. 7) set the mixing ratio.

Speakers 302L and 302R respectively turn the stereo outputs from mixers 300L and 300R gone through amplifiers 301L and 301R into played musical sounds mixed with reproduced musical sounds.

Figure 10:
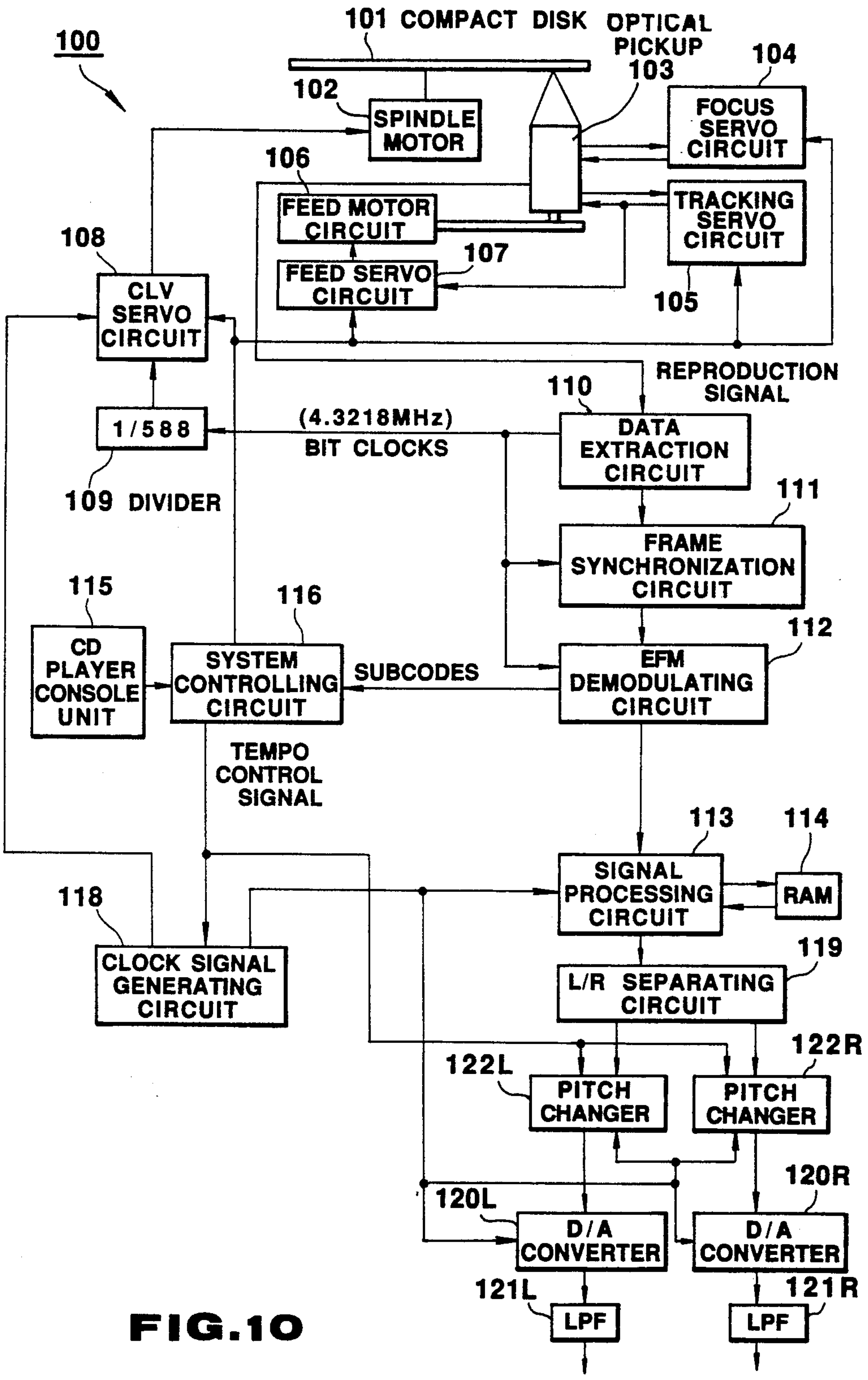
FIG. 10 is a block diagram of the CD player unit used in the second embodiment of this invention.

The following is a description of the changes in the configuration of the CD player unit 100 used in the second embodiment shown in FIG. 10 from that used in the first embodiment shown in FIG. 2.

The distinct difference is that the pitch changers 122L and 122R are inserted respectively between the L/R separating circuit 119 and the D/A converter 120L and between the L/R separating circuit 119 and the D/A converter 120R.

FIG. 10 is a block diagram of the CD player unit used in the second embodiment of this invention.

In FIG. 10, when the tempo control buttons 129 shown in FIG. 3 are manipulated, the system controlling circuit 116 outputs tempo control signals, which change the frequencies of the clock signals from the clock signal generating circuit 118 and the frequencies of the bit clock signals in the CD reproduction signals change by the same ratio, concurrently as well as sampling frequencies of the D/A converters 120L and 120R, the clock signal frequencies of the L/R separating circuit 119, and other pertinent frequencies, such as those of various clocks for the earlier stated LSIs and the frame synchronization signals.

When the tempos of playing the CD 101 are changed, as described above, the pitches of the reproduced musical sounds are also changed. Thus, the pitch changers 122L and 122R reverse the changed pitches back to the original pitches.

The following is a description of the pitch changers 122L and 122R.

Figure 12:
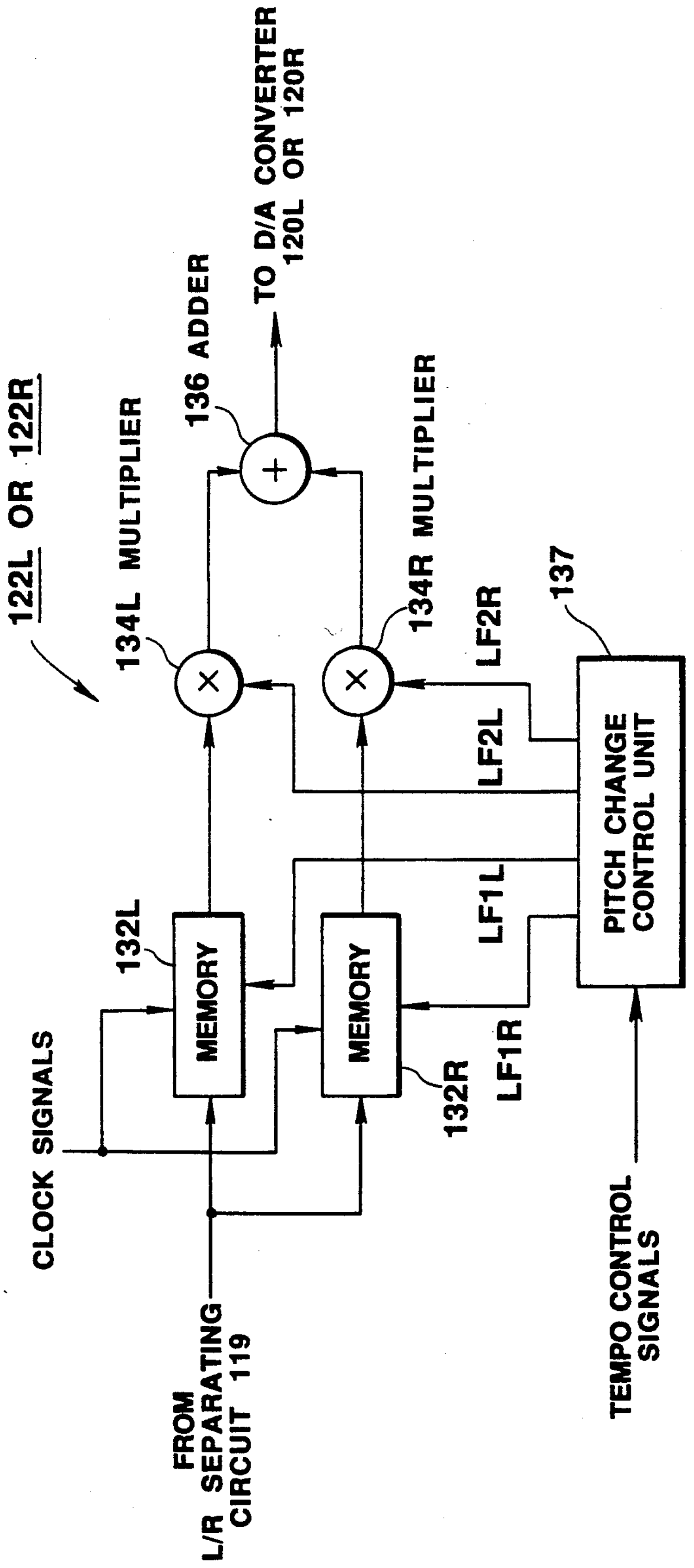
FIG. 12 is a block diagram of pitch changers used in the second embodiment of this invention.

FIG. 12 is a block diagram of pitch changers used in the second embodiment of this invention.

In FIG. 12, L or R channel digital data separated by the L/R separating circuit 119, shown in FIG. 8, are respectively inputted to memories 132L and 132R, which are e.g. multistage shift registers for contemporaneously shifting data having 16-bit widths. Each time a clock signal is received, L and R 16-bit digital data are parallelly written in flip-flop group in the first stage of the multistage shift registers contemporaneously when the parallel 16-bit data in the respective stages are shifted sequentially to their next stages. The flip-flop groups in the respective stages output the respective parallel 16-bit data at that particular timing. By controlling the address signals (select signals) for selecting the outputs from the respective stages of the multistage shift register, pitches are changed as follows.

FIGS. 13A through 13D show the amplitude data and address signals of the pitch changers used in the second embodiment of this invention.

In FIGS. 13A through 13D, a pitch change control unit 137 controls L and R address signals LF1L and LF1R as well as L and R amplitude data LF2L and LF2R given to waveforms read by address signals LF1L and LF1R.

FIG. 13A shows address signal LF1L for reading memory 132L and pitches can be be increased or decreased by changing address signal LF1L. For instance, to double pitches, the pitch change control unit 137 needs only to control address signal LF1L so that forward shifted stages in memory 132L are read each time a clock signal is inputted. However, since the reading speed is twice as fast as the writing speed, the pitch change control unit 137 changes address signal LF1L so that the same waveform data are twice in succession.

However, if the same waveform data are read twice in succession, ordinarily the waveforms become discontinuous at the beginning of the second waveform. Thus, the inputted data stored in memory 132R shown in FIG. 12 are read by address signal LF1R, shown in FIG. 13B, obtained by slipping the phase of address signal LF1L. By cross-fading the amplitudes of the two (2) waveforms, as shown in FIGS. 13C and 13D, the effect of the discontinuity is eliminated.

To do so, a multiplier 134L multiplies the waveform output, shown in FIG. 13A, read by address signal LF1L by amplitude data LF2L shown in FIG. 13C. Similarly, a multiplier 134R multiplies the waveform output, shown in FIG. 13B, read by address signal LF1R by amplitude data LF2R, shown in FIG. 13D. In this case, the period of respective amplitude data LF2L and LF2R, shown in FIGS. 13C and 13D, are set equal to the period of respective address signals LF1L and LF1R, shown in FIGS. 13A and 13B. Thereafter, an adder 136 adds the respective outputs from multipliers 134L and 134R and the added value becomes the output of L or R pitch changer 124L or 124R.

Although the above description is for a case in which the pitches of inputted data are doubled, pitches can be changed by some other magnification rate by having the pitch change control unit 137 control address signals LF1L and LF1R as well as amplitude data LF2L and LF2R.

Pitch changers 124L and 124R of the above configurations, shown in FIG. 10, multiply pitches by $2^{1/12}$, when CD reproduction tempos are multiplied, for instance, by $2^{-1/12}$. Thus, when a change in CD reproduction speed causes a tempo change, pitch changers 124L and 124R automatically act to compensate the change, the pitch changes of CD reproduced sounds are prevented.

The following is a description of the configuration and actions of the electronic keyboard musical instrument unit 200 shown in FIG. 9.

Figure 11:
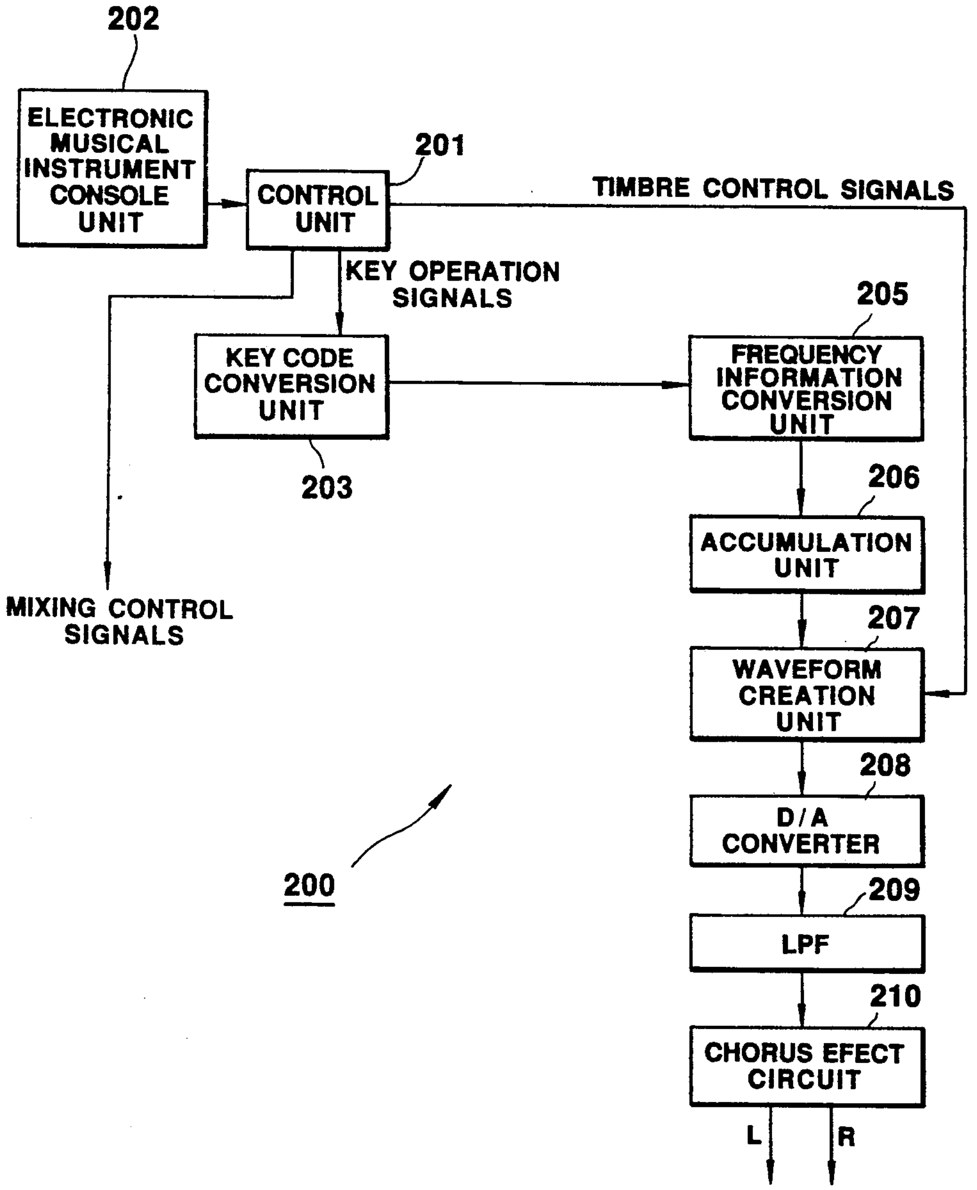
FIG. 11 is a block diagram of an electronic keyboard musical instrument unit used in the second embodiment of this invention.

FIG. 11 is a block diagram of an electronic keyboard musical instrument unit used in the second embodiment of this invention.

The main difference of the configuration shown in FIG. 11 from that shown in FIG. 7 is that the latter does not have the calculation unit 204.

As shown in FIG. 8, the electronic musical instrument console unit 202 shown in FIG. 11 has the mixer switch 202*a* for mixing the musical sounds produced by the electronic musical instruments with the sounds reproduced from CD, the keyboard 202*b* and the timbre/effector switches 202*c*.

In FIG. 11, the control unit 201 comprises a depressed key detection/sound production assignment circuit, which receives information regarding which keys on the keyboard 202*b* in the electronic musical instrument console unit 202 are being depressed by scanning keys at a predetermined cycle. When a key is depressed, the control unit 201 assigns the depressed key to any of a plurality of sound production assignment channels, and transmits the key operation signals based on the key operation to the key code conversion unit 203, which converts the key operation signals to the key code for identifying the depressed key. The key code is inputted to a frequency information conversion unit 205, and the frequency information conversion unit 205 outputs the frequency number corresponding to the pitch of the key code. Then, the accumulation unit 206 repeats accumulations of the frequency number at a predetermined cycle and outputs the accumulated value, which changes at the speed corresponding to the key number, to the waveform creation unit 207. Next, the accumulated value is used e.g. as an address of the waveform creation unit 207, which is a waveform memory, in reading musical sound waveform data from the waveform creation unit 207. When the performer selects a musical instrument timbre by manipulating one of the timbre/effector selection switches 202*c*, the control unit 201 outputs timbre control signals to the waveform creation unit 207 and the waveform data corresponding to the selected one of the timbre/effector selection switches 202*c* are read.

The waveform data thus read become the musical sound signals having the pitch corresponding to the key code of the depressed key. After the D/A converter 208 converts the musical sound signals to analog signals, the LPF 209 smooth the analog signals. If a chorus effect is selected by the timbre/effector selection switches 202*c*, the chorus effect circuit 210 separates the analog signals into two channel (L and R) musical sound signals having a quasi-stereo effect.

As is evident from the above description, when the tempo is changed by changes in the CD sound reproduction speed, since pitch changers 124L and 124R automatically act to compensate the change, the pitch changes of CD reproduced sounds are prevented.

That is, even if a CD sound reproduction speed is changed to slow the tempo of the CD reproduced musical sounds so that a novice can practice an electronic musical instrument more easily accompanied by a performance reproduced from e.g. a CD, the pitch changing means keep the pitches of the CD reproduced musical sounds from changing.

Therefore, since the player can freely change the tempo of an accompanying music prerecorded on such a recording medium as a CD with its image and timbre maintained, without having to manually retune the electronic musical instrument, the second embodiment of this invention is very appropriate for building an electronic musical instrument extremely well suited for the practice by a novice.

What is claimed is:

1. An apparatus for controlling reproduction states of audio signals recorded in recording media and generation states of musical sound signals in synchronism with the reproduction states, comprising:

audio reproducing means for reproducing audio signals by driving the recording media;

performance information output means for outputting performance information including such key codes that specify pitches of the musical sound signals;

musical sound signal generating means, connected to said performance information output means, for sequentially generating musical sound signals in correspondence with inputted performance information which is outputted from said performance information output means;

setting means, connected to said audio reproducing means, for setting reproduction speed data of the audio signals; and audio control means, connected to said audio reproducing means, said musical sound signal generating means and said setting means, for controlling reproduction states of the audio signals and generation states of the musical sound signals including means for generating the audio signals at set reproduction speeds corresponding to reproduction speed data set by said setting means by controlling speeds for driving in the recording media, thereby changing pitches of reproduced audio signals in correspondence with the set reproduction speeds, and further including means for controlling said musical sound signal generating means in correspondence with said reproduction speed data set by said setting means and changing the pitches of the musical sound signals so that the pitch changes of the reproduced audio signals are conformed to the same pitch changes of the musical sound signals.

2. The apparatus according to claim 1, wherein:

said performance information output means includes a keyboard equipped with predetermined octave keys and means for outputting said performance information in correspondence with a keyboard performance operation.

3. The apparatus according to claim 1, wherein:

said control means derives pitch control signals based on the set reproduction speed data and the key codes, and outputs said pitch control signals to said musical sound signal generation means so that the pitch changes of the reproduced audio signals are conformed to the same pitch changes of the musical sound signals.

4. The apparatus according to claim 1, wherein:

said audio reproducing means is a compact disc player having means, including a phase locked loop, to perform synchronous control of the reproduction speeds of the compact disc player, based on clock signals; and said audio control means changes the reproduction speeds by changing frequencies of the clock signals used for the phase locked loop.

5. The apparatus according to claim 1, wherein;

said setting means includes an input means for inputting speed change incremens where one unit of the speed change increments is equivalent to a semitone, or half a whole tone, converted to the pitch changes of the reproduced signals, and said setting means sets reproduction speed data of the reproduced audio signals in correspondence with the speed change increments inputted by the input means.

6. An apparatus for controlling reproduction states of audio signals recorded in recording media to be conformed to pitches of musical sound signals generated in synchronism with the reproduction states, comprising:

audio reproducing means for reproducing audio signals by driving the recording media;

performance information output means for outputting performance information including such key codes that specify pitches of the musical sound signals;

musical sound signal generating means, connected to said performance information output means, for sequentially generating musical sound signals in correspondence with inputted performance information which is outputted from said performance output means;

setting means, connected to said audio reproducing means, for setting reproduction speed data of the audio signals; and audio control means, connected to said audio reproducing means and said setting means, for controlling reproduction states of the audio signals to be conformed to pitches of the musical sound signals including means for generating the audio signals at set reproduction speeds corresponding to reproduction speed data set by said setting means by controlling speeds for driving the recording media, thereby changing pitches of reproduced audio signals in correspondence with the set reproduction speeds, and further including means for controlling the reproduced audio signals in correspondence with said reproduction speed data set by said setting means and compensating the pitches of the reproduced audio signals so as to allow audio signals of the original signals to be reproduced.

7. The apparatus according to claim 6, wherein:

said performance information output means includes a keyboard equipped with predetermined octave keys and means for outputting the performance information in correspondence with a keyboard performance operation.

* * * * *